United States Patent
Baba

(10) Patent No.: US 9,252,847 B2
(45) Date of Patent: Feb. 2, 2016

(54) COMMUNICATION APPARATUS, METHOD AND STORAGE MEDIUM FOR SHORT RANGE COMMUNICATION

(71) Applicant: CANON KABUSHIKI KAISHA, Tokyo (JP)

(72) Inventor: Tatsuru Baba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/273,592

(22) Filed: May 9, 2014

(65) Prior Publication Data

US 2014/0340698 A1 Nov. 20, 2014

(30) Foreign Application Priority Data

May 20, 2013 (JP) .................................. 2013-106593

(51) Int. Cl.
| | |
|---|---|
| G06F 3/12 | (2006.01) |
| H04B 5/00 | (2006.01) |
| H04W 4/20 | (2009.01) |
| H04W 4/00 | (2009.01) |
| H04N 1/00 | (2006.01) |

(52) U.S. Cl.
CPC ............ *H04B 5/0056* (2013.01); *H04B 5/0031* (2013.01); *H04B 5/0037* (2013.01); *H04N 1/00344* (2013.01); *H04N 1/00891* (2013.01); *H04N 1/00896* (2013.01); *H04N 1/00315* (2013.01); *H04N 1/00342* (2013.01); *H04N 2201/006* (2013.01); *H04N 2201/0075* (2013.01); *H04N 2201/0094* (2013.01); *H04W 4/008* (2013.01); *H04W 4/20* (2013.01)

(58) Field of Classification Search
None
See application file for complete search history.

(56) References Cited

U.S. PATENT DOCUMENTS

| | | | |
|---|---|---|---|
| 2004/0263872 A1* | 12/2004 | Uchiyama ...................... 358/1.2 |
| 2007/0196099 A1* | 8/2007 | Ishiyama et al. .............. 396/301 |
| 2009/0190185 A1* | 7/2009 | Sugiura ......................... 358/471 |
| 2009/0291634 A1* | 11/2009 | Saarisalo .......... H04M 1/72527 455/41.1 |
| 2010/0178866 A1* | 7/2010 | Jalkanen .............. G06K 7/0008 455/41.1 |
| 2011/0171907 A1* | 7/2011 | Jolivet ................ H04L 63/0492 455/41.1 |
| 2012/0196530 A1* | 8/2012 | Moosavi ........... H04W 52/0251 455/41.1 |
| 2013/0040563 A1* | 2/2013 | Kim .................... G06Q 20/3572 455/41.1 |
| 2014/0302785 A1* | 10/2014 | Arora et al. .................. 455/41.2 |

FOREIGN PATENT DOCUMENTS

JP 2011-060046 A 3/2011

\* cited by examiner

*Primary Examiner* — Miya J Cato
(74) *Attorney, Agent, or Firm* — Carter, DeLuca, Farrell & Schmidt, LLP

(57) ABSTRACT

A communication apparatus (image forming apparatus) according to an aspect of the present invention is capable of communication with an external apparatus via short-range wireless communication (NFC) and while in a powered-on state (first state), registers a piece of data being held by the communication apparatus as NFC transmission data that is to be transmitted by the communication apparatus in a powered-off state (second state). Furthermore, when shifting from the powered-on state to the powered-off state, the communication apparatus sets the registered NFC transmission data in an NFC controller as data that is to be transmitted to an external apparatus such as a mobile terminal via NFC communication.

16 Claims, 12 Drawing Sheets

F I G. 1
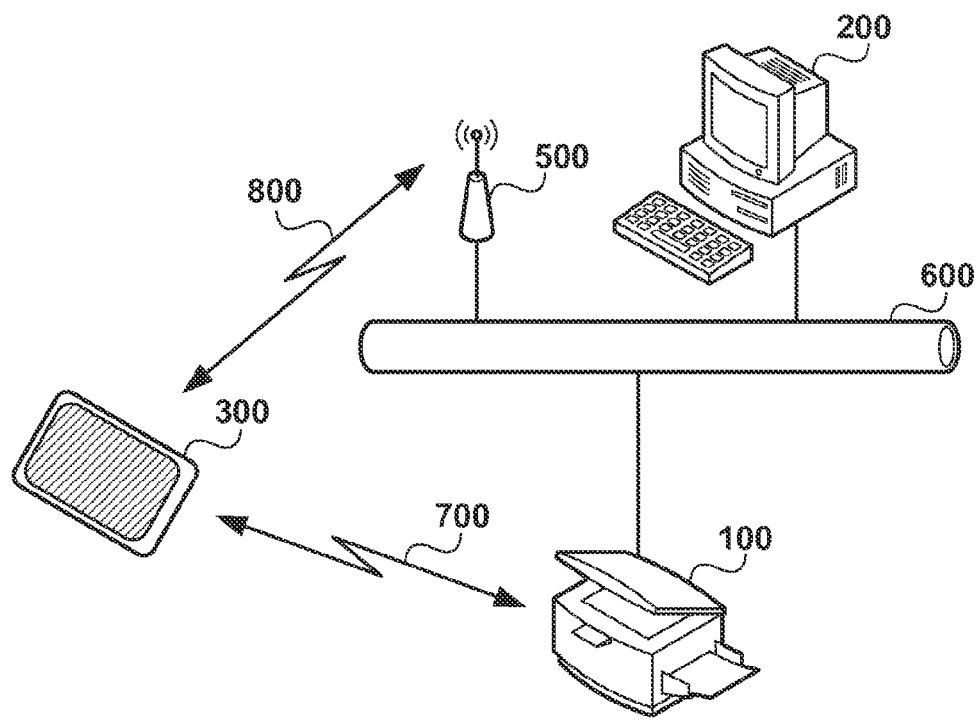

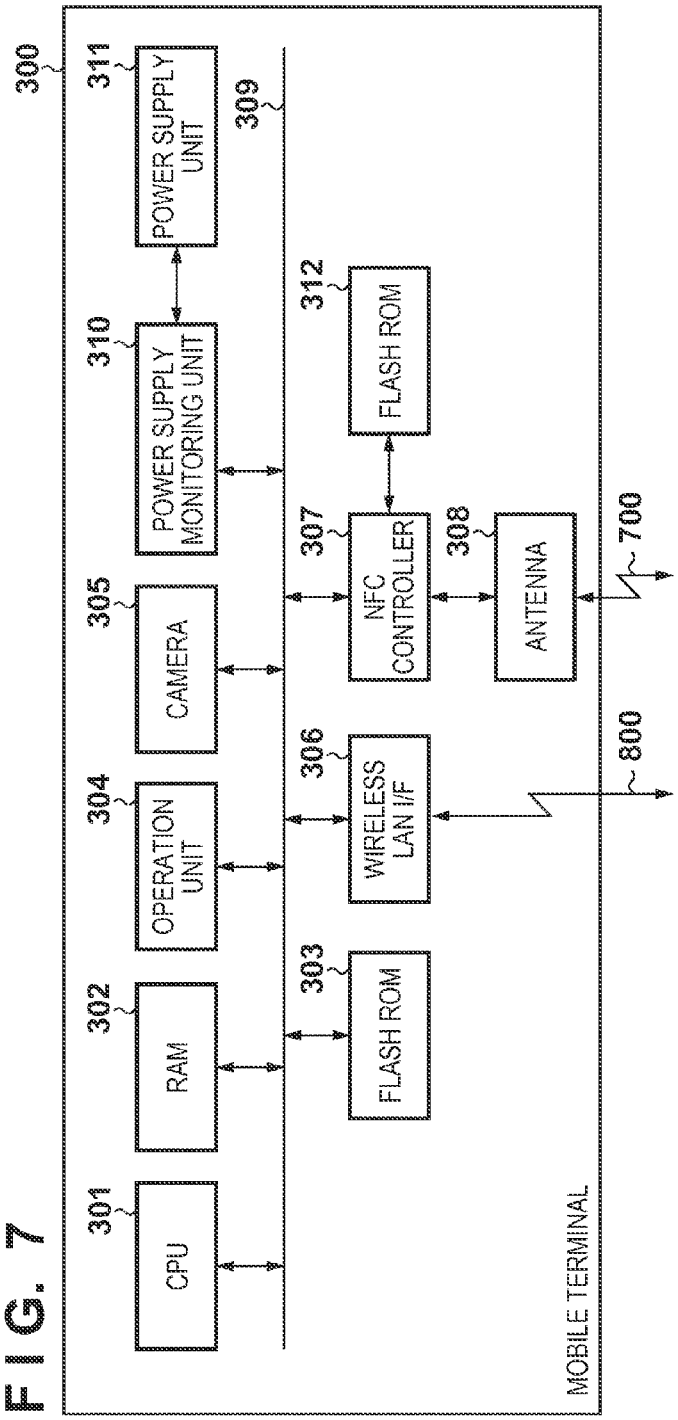

COMMUNICATION APPARATUS, METHOD AND STORAGE MEDIUM FOR SHORT RANGE COMMUNICATION

BACKGROUND OF THE INVENTION

1. Field of the Invention

The present invention relates to communication apparatuses, methods for controlling the same, and storage medium.

2. Description of the Related Art

In recent years, Near Field Communication (NFC), which is a short-range wireless communication technique that is compatible with RFID, has started to be implemented in mobile terminals such as a smartphone and a tablet computer. Three functions are defined with the NFC standard, namely a reader/writer function, a card emulation function, and an inter-device communication (peer-to-peer (P2P)) function. The reader/writer function is a function of performing reading and writing of data between NFC-compatible devices, such as NFC cards and NFC tags, and it is similar to an RFID (Radio Frequency IDentification) reader/writer. The card emulation function is a function of operating similarly to an NFC card or an NFC tag. The P2P function is a function of performing data exchange between NFC-compatible devices. A reader/writer is implemented in a mobile terminal equipped with an NFC function, and by using the implemented reader/writer, reading and writing of data can be performed between NFC cards, NFC tags, RFID tags, and the like.

In image forming apparatuses as well, an authentication function for performing control of whether or not to permit use of the apparatus by a user has previously been realized using RFID tags, but this function can be realized using NFC. Also, if an image forming apparatus is equipped with an NFC function, it is possible not only to use the reader/writer function to execute an authentication function such as that above, but it is also possible to use the card emulation function to perform communication with a mobile terminal equipped with the NFC function. According to this, information regarding the image forming apparatus, such as information regarding consumables (i.e., the amount of paper remaining in the paper feeding tray of the image forming apparatus), the processing status of print jobs being processed by the image forming apparatus, and setting information of the image forming apparatus, can be displayed on the mobile terminal.

With an apparatus that uses the NFC function, much less power is consumed in the case of using the card emulation function than in the case of using the reader/writer function and the P2P function. For this reason, with an apparatus that uses the NFC function, it can be said that it is desirable to perform control such that the card emulation function is used as much as possible so as to reduce power consumption.

For example, Japanese Patent Laid-Open No. 2011-60046 proposes a technique in which, according to the operation state of an information processing apparatus that includes an NFC device, the communication mode of the NFC device is switched between an operation mode for functioning as a reader/writer and an operation mode for functioning as an active tag. Specifically, the NFC device is operated in an active tag mode if the operation state of the information processing apparatus is a powered-off state or a power-saving state, and the NFC device is operated in a reader/writer mode if the operation state is a normal power state.

However, there is a trade-off between the amount of data that can be exchanged and power consumption in the case of using the card emulation function. For example, in the case of exchanging a large amount of data, a large-capacity buffer and energization of a circuit that performs communication control for exchanging large amounts of data are required, and therefore power consumption increases. On the other hand, in the case of using the card emulation function in an electromagnetic induction mode, the number of circuits that can be energized is limited, and therefore only a small amount of data can be exchanged. For this reason, with a device equipped with the NFC function, it is necessary to appropriately select the data that is to be exchanged when operating using the card emulation function.

SUMMARY OF THE INVENTION

The present invention has been made in view of the above problems. The present invention provides a technique of more appropriately selecting transmission data when operating in a state of reduced power consumption in a communication apparatus capable of communicating with an external apparatus via short-range wireless communication (NFC).

According to one aspect of the present invention, there is provided a communication apparatus that can communicate with an external apparatus via short-range wireless communication, the communication apparatus comprising: a communication unit configured to perform short-range wireless communication with an external apparatus that is located within a communication coverage; a registration unit configured to, while the communication apparatus is in a first state, register a piece of data being held by the communication apparatus as transmission data that is to be transmitted by the communication apparatus to the external apparatus via the communication unit in a second state in which power consumption is at least lower than in the first state; and a control unit configured to, when the communication apparatus is to be shifted from the first state to the second state, set the transmission data registered by the registration unit in the communication unit as data that is to be transmitted to the external apparatus via the short-range wireless communication.

According to another aspect of the present invention, there is provided a method for controlling a communication apparatus that includes a communication unit configured to perform short-range wireless communication with an external apparatus that is located within a communication coverage, and that can communicate with the external apparatus using the short-range wireless communication, the method comprising: registering, while the communication apparatus is in a first state, a piece of data being held by the communication apparatus as transmission data that is to be transmitted by the communication apparatus to the external apparatus via the communication unit in a second state in which power consumption is at least lower than in the first state; and setting, when the communication apparatus is to be shifted from the first state to the second state, the transmission data that has been registered in the registering in the communication unit as data that is to be transmitted to the external apparatus via the short-range wireless communication.

According to still another aspect of the present invention, there is provided a computer-readable storage medium storing a computer program for causing a computer to execute steps of a method for controlling a communication apparatus that includes a communication unit configured to perform short-range wireless communication with an external apparatus that is located within a communication coverage, and that can communicate with the external apparatus using the short-range wireless communication, the method comprising: registering, while the communication apparatus is in a first state, a piece of data being held by the communication apparatus as transmission data that is to be transmitted by the communication apparatus to the external apparatus via the communication unit in a second state in which power consumption is at least lower than in the first state; and setting, when the communication apparatus is to be shifted from the first state to the second state, the transmission data that has been registered in the registering in the communication unit as data that is to be transmitted to the external apparatus via the short-range wireless communication.

According to the present invention, it is possible to provide a technique of more appropriately selecting transmission data when operating in a state of reduced power consumption in a communication apparatus capable of communicating with an external apparatus via short-range wireless communication.

Further features of the present invention will become apparent from the following description of exemplary embodiments with reference to the attached drawings.

BRIEF DESCRIPTION OF THE DRAWINGS

FIG. 1 is a diagram showing an example of an overall system configuration.

FIG. 6 is a diagram showing an example of setting data and selection flags that are managed in the image forming apparatus 100 according to the first embodiment.

FIG. 7 is a block diagram showing an example of a configuration of a mobile terminal 300 according to a second embodiment.

DESCRIPTION OF THE EMBODIMENTS

Figure 2:
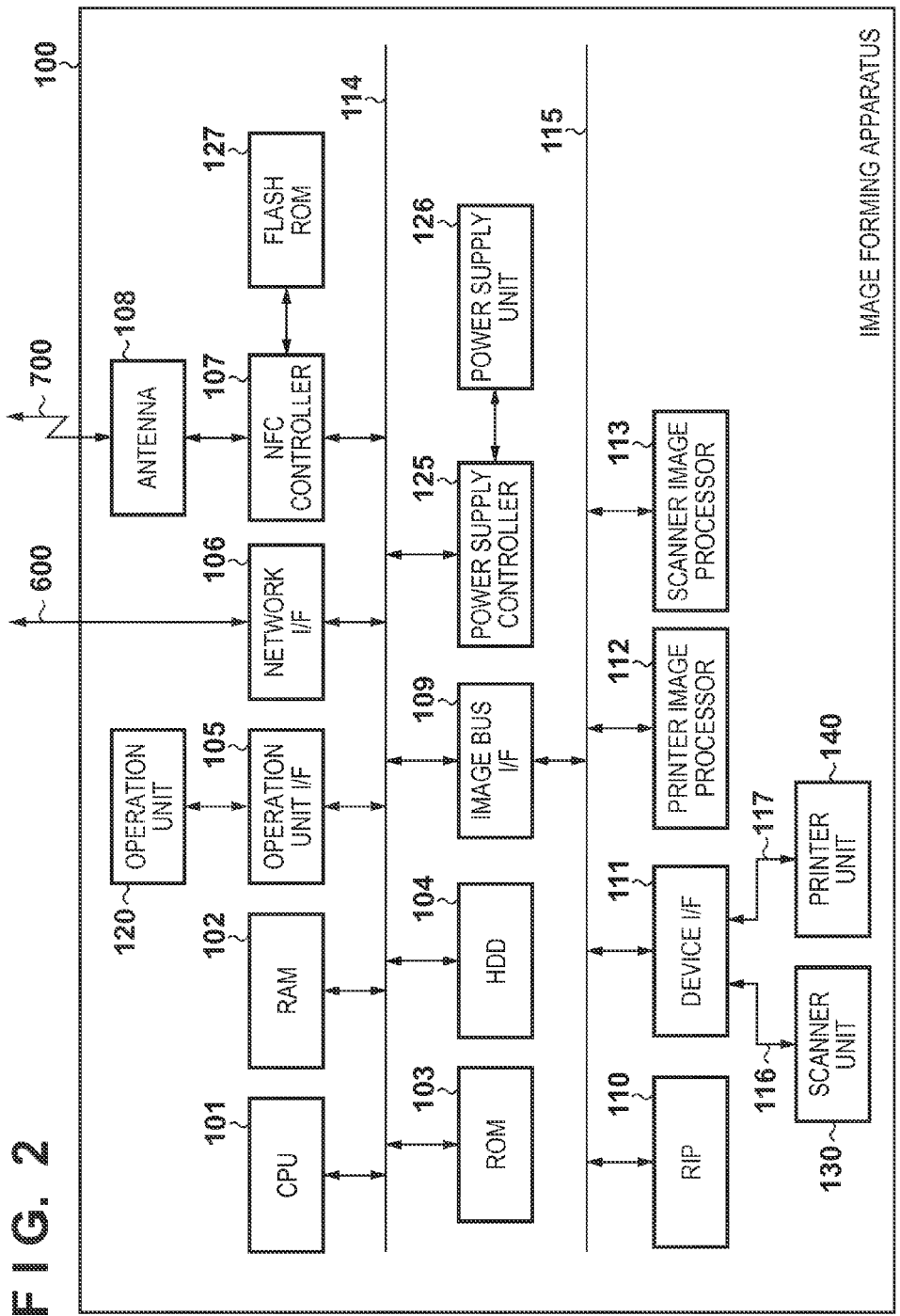
FIG. 2 is a block diagram showing an example of a configuration of an image forming apparatus 100 according to a first embodiment.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

A first embodiment of the present invention will be described first with reference to FIGS. 1 to 6. The first embodiment will describe a case where the present invention has been applied to an image forming apparatus as an example of a communication apparatus of the present invention.

<System Configuration>

FIG. 1 is a diagram showing an example of the overall system configuration according to the present embodiment. This system includes an image forming apparatus 100, a personal computer (PC) 200, a mobile terminal 300, a wireless LAN access point 500, and a local area network (LAN) 600. Note that the system may include any number of PCs, mobile terminals, image forming apparatuses, and the like.

The image forming apparatus 100 has a copy function, a print function, and a scan function, and furthermore has an authentication function for performing authentication on a user who is to use these functions as well. An authentication card (not shown) on which the user's ID information is recorded is used in the user authentication. The image forming apparatus 100 receives the user's ID information recorded on the authentication card via communication using Near Field Communication (NFC) scheme (NFC communication) 700 and performs user authentication based on a database for authentication (not shown) that is held in the image forming apparatus 100. Note that instead of holding the database for authentication in the image forming apparatus 100, a server for performing authentication processing may be arranged in the LAN 600 for example, and authentication processing may be executed using this server via the LAN 600. The PC 200 can transmit a print job to the image forming apparatus 100 and can reference data that has been computerized by the image forming apparatus 100.

The mobile terminal 300 is a portable information processing terminal that includes an NFC communication function, a wireless LAN communication function, and the like, and is a smartphone or a tablet computer, for example. The mobile terminal 300 can perform communication with the image forming apparatus 100 via the NFC communication 700. For example, the mobile terminal 300 exchanges information such as IP address information and user ID information with the image forming apparatus 100 via the NFC communication 700. Also, the mobile terminal 300 includes a wireless LAN interface (I/F). For this reason, the mobile terminal 300 can transmit image data held in the mobile terminal 300 to the image forming apparatus 100 via wireless LAN communication 800 and cause the image forming apparatus 100 to execute printing based on that image data.

The wireless LAN access point 500 can perform communication with a device that includes a wireless LAN I/F such as the mobile terminal 300, and is connected to the LAN 600. The mobile terminal 300 can perform communication with a device connected to the LAN 600 via the wireless LAN access point 500. Note that although a system configuration using a wireless LAN is given as an example in the present embodiment, a system configuration that is compliant with another wireless communication standard such as Bluetooth may be used instead of the wireless LAN.

The LAN 600 is a network that is compliant with a communication standard such as Ethernet. In the present embodiment, the image forming apparatus 100, the PC 200, and the wireless LAN access point 500 are connected via the LAN 600.

Note that in the present embodiment, the image forming apparatus 100 is an example of a communication apparatus that is capable of communicating with an external apparatus via short-range wireless communication, and the mobile terminal 300 is an example of an external apparatus.

<Configuration of Image Forming Apparatus>

FIG. 2 is a block diagram showing an example of the configuration of the image forming apparatus 100 according to the present embodiment. The image forming apparatus 100 includes a CPU 101, a RAM 102, a ROM 103, an HDD 104, an operation unit I/F 105, a network I/F 106, an NFC controller 107, an image bus I/F 109, and a power supply controller 125, which are connected via a system bus 114. Also, the image forming apparatus 100 includes an operation unit 120 that is connected to the operation unit I/F 105, and an antenna 108 that is connected to the NFC controller 107. The image forming apparatus 100 furthermore includes a RIP 110, a device I/F 111, a printer image processor 112, and a scanner image processor 113 as functional blocks that perform image processing, and these blocks are connected via an image bus 115.

The CPU 101 performs overall control of the image forming apparatus 100. The RAM 102 is a volatile memory that is used as a working memory for temporarily storing data that is to be used by the CPU 101 for arithmetic operations. The ROM 103 stores a program used for starting up the image forming apparatus 100 and is mainly used when the image forming apparatus 100 is started up. The hard disk drive (HDD) 104 is a non-volatile storage device that stores various types of data such as software related to the control of the image forming apparatus 100, various types of setting data, and stored document data.

The operation unit 120 includes a liquid crystal display (LCD) and a touch panel and functions as an input I/F for receiving input of information to the image forming apparatus 100 according to an operation performed by a user of the image forming apparatus 100, and as an output I/F for outputting information to the user. The operation unit I/F 105 is an I/F for the operation unit 120 and relays data that is exchanged between the operation unit 120 and the system bus 114.

The network I/F 106 is an I/F for exchanging data with an external apparatus via the LAN 600. The NFC controller 107 performs control for performing the NFC communication 700 via the antenna 108. The antenna 108 is an antenna for performing the NFC communication 700 and transmits/receives radio waves for the NFC communication 700 to/from an external apparatus.

A flash ROM 127 is connected to the NFC controller 107 and is used for holding data that is to be handled by the NFC controller 107. Data that is to be transmitted by the NFC controller 107 via the antenna 108 via the NFC communication 700 can be stored in the flash ROM 127. Note that the image forming apparatus 100 according to the present embodiment uses the flash ROM 127 for holding data that is to be handled by the NFC controller 107, but the present invention is not limited to this. For example, it is possible to use another non-volatile memory or a combination of a battery and an SRAM.

The power supply controller 125 controls the power supply of the image forming apparatus 100 (power supply unit 126) and controls the power supply according to a user operation performed on a power supply switch (not shown). Upon detecting a power-off operation performed using the power supply switch, the power supply controller 125 can use a power-off request to notify the CPU 101 of the detection result. The power supply unit 126 is a power supply that converts AC power supplied from the exterior into DC power and supplies it to the devices in the image forming apparatus 100. The power supply unit 126 is controlled by the power supply controller 125 and switches the above-described conversion operation on and off according to an instruction from the power supply controller 125.

The image bus I/F 109 is connected between the system bus 114 and the image bus 115, relays data between the buses, and converts the structure of data that is to be relayed. A raster image processor (RIP) 110 converts page description language (PDL) code, display lists, and the like into bitmap images. The device I/F 111 is an I/F that connects a scanner unit 130 and a printer unit 140 to the image bus 115.

The device I/F 111 adjusts the timing at which the image data received from the scanner unit 130 is transmitted to the image bus 115, and adjusts the timing at which the image data is transmitted from the image bus 115 to the printer unit 140. The scanner unit 130 generates image data using a scanner sensor and performs processing such as correction and resolution conversion that is appropriate for the image forming apparatus 100 on the generated image data. The printer unit 140 forms an image on a sheet (recording medium) based on the image data input via the device I/F 111. Also, the printer unit 140 performs processing such as correction and resolution conversion that is appropriate for the print engine of the image forming apparatus 100 on the image data for print output.

Figure 3:
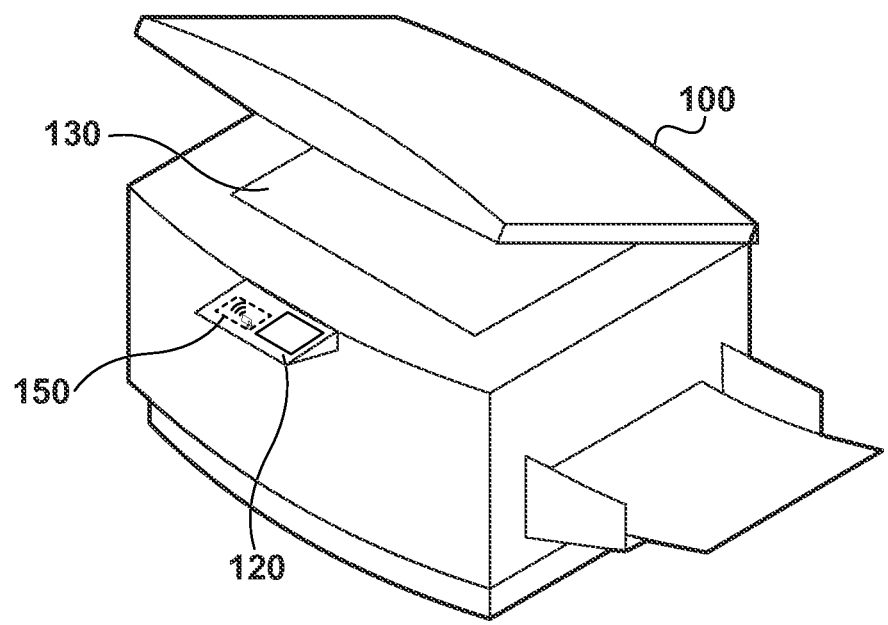
FIG. 3 is a diagram showing the external appearance of the image forming apparatus 100 according to the first embodiment.

FIG. 3 is a diagram showing the external appearance of the image forming apparatus 100 according to the present embodiment. The operation unit 120 and an NFC antenna mark 150 that is provided on the operation unit 120 and indicates the installation position of the NFC antenna 108 are arranged on the front face of the image forming apparatus 100. The scanner unit 130 is arranged on the top face of the image forming apparatus 100. In the present embodiment, an example is shown in which the NFC antenna 108 and the NFC antenna mark 150 are arranged on the operation unit 120, but they may be arranged at any position on the surface of the image forming apparatus 100.

(Operation of NFC Controller 107)

If the image forming apparatus 100 is in the normal operation state or a standby state, the NFC controller 107 can operate in a reader/writer mode (first mode) or a card emulation mode (second mode). Here, the reader/writer mode is an operation mode in which reading and writing of information can be performed via NFC, which is short-range wireless communication, with respect to an external apparatus (mobile terminal 300) that is located within a communication coverage. In addition, the card emulation mode is an operation mode in which an external apparatus (mobile terminal 300) that is located within a communication coverage can perform reading and writing of information via NFC with respect to the image forming apparatus 100. The flash ROM 127 stores information that is readable by an external reader/writer when operating in the card emulation mode. Note that in the present embodiment, the NFC controller 107 is an example of a communication unit.

The NFC controller 107 can receive a supply of power via a wire from the internal power supply and the like of the image forming apparatus 100. Also, when performing short-range wireless communication with the external reader/writer, the NFC controller 107 can operate by receiving a supply of power via radio waves received using the antenna 108. Note that data access from the external reader/writer to the flash ROM 127 can be performed by receiving a supply of power using a wire from the internal power supply and the like of the image forming apparatus 100 in addition to being performed by receiving a supply of power from the antenna 108. That is to say, even after the image forming apparatus 100 enters the powered-off state, the information stored in the flash ROM 127 can be read by the external reader/writer via the NFC communication 700.

The NFC controller 107 stores information that can be read by the external reader/writer in the flash ROM 127. By exchanging information with the NFC controller 107, the CPU 101 can write information to the flash ROM 127 and read information from the flash ROM 127.

<Processing for Setting NFC Transmission Data>

Figure 4:
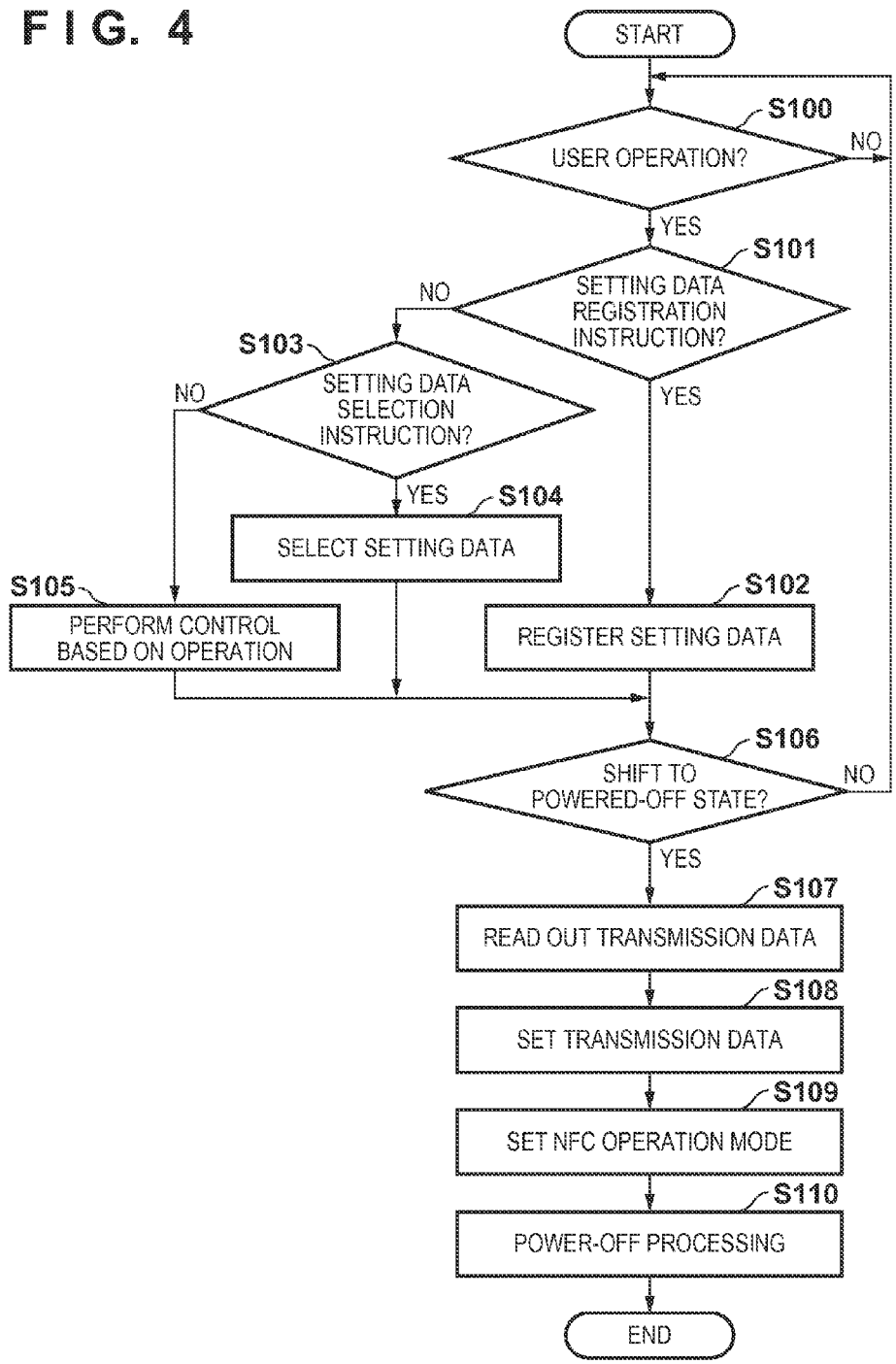
FIG. 4 is a flowchart showing a procedure of processing for setting NFC transmission data in the image forming apparatus 100 according to the first embodiment.

FIG. 4 is a flowchart showing a procedure of processing for setting NFC transmission data in the image forming apparatus 100 according to the present embodiment. Note that the processing shown in FIG. 4 is realized in the image forming apparatus 100 by the CPU 101 reading out a program stored in the ROM 103 to the RAM 102 and executing it in the powered-on state in which the power supply unit 126 has been started up. The image forming apparatus 100 can receive an operation from the user via the operation unit 120 in the powered-on state in which the power supply unit 126 has been started up. The powered-on state corresponds to the state in which power is supplied to multiple devices included in the image forming apparatus 100 from the power supply unit 126 (first state). If an operation has not been performed by the user in step S100 ("NO" in step S100), the CPU 101 enters a state of waiting to receive print data. On the other hand, upon detecting a user operation ("YES" in step S100), the CPU 101 moves to the processing of step S101.

In step S101, the CPU 101 determines whether or not an instruction to register setting data has been given through a user operation. If an instruction to register setting data has been given ("YES" in step S101), the CPU 101 receives input of the setting data from the user via the operation unit 120 in step S102. Upon receiving the input setting data from the operation unit I/F 105 via the system bus 114 in step S102, the CPU 101 stores the received setting data in the RAM 102 or the HDD 104, thereby registering it as setting data. Subsequently, the procedure moves to the processing of step S106.

In the present embodiment, the setting data is an example of data that is selectable as NFC transmission data for NFC transmission performed by the NFC controller 107. Setting data is mainly information that is set by an administrator, such as an IP address assigned to the image forming apparatus 100 for example, and is information that is needed when the image forming apparatus 100 performs communication with an external apparatus such as the mobile terminal 300. The image forming apparatus 100 can provide this kind of setting data to an external apparatus via the NFC communication 700. Note that the data that is selectable as NFC transmission data for NFC transmission performed by the NFC controller 107 can include not only setting data such as that described above, but also data indicating the state of the image forming apparatus 100 (e.g., internal information indicating the state of consumables and the like).

On the other hand, if an instruction to register setting data has not been given ("NO" in step S101), the CPU 101 determines in step S103 whether or not an instruction to select setting data has been given through a user operation. If an instruction to select setting data has been given ("YES" in step S103), the CPU 101 receives input of the setting data selection information from the user via the operation unit 120 in step S104. Upon receiving the input selection information from the operation unit I/F 105 via the system bus 114, the CPU 101 selects setting data based on the received selection information in step S104. On the other hand, if an instruction to select setting data has not been given ("NO" in step S103), in step S105, the CPU 101 receives operation information indicating a user operation from the operation unit I/F 105 via the system bus 114 and performs control based on that operation information. When step S104 or step S105 is complete, the CPU 101 moves to the processing of step S106.

Here, the selection of the setting data in step S104 corresponds to the registration of the transmission data that is to be transmitted via the NFC controller 107 by the image forming apparatus 100 to an external apparatus such as the mobile terminal 300. In this way, the CPU 101 registers the data selected out of the data (setting data) held by the image forming apparatus 100 as NFC transmission data that is to be transmitted by the image forming apparatus 100 via the NFC communication 700 in the powered-off state in which the power supply unit 126 has been stopped. Note that in the present embodiment, the powered-off state is an example of the second state.

Next, in step S106, the CPU 101 determines whether or not the image forming apparatus 100 is to be shifted to the powered-off state based on a notification from the power supply controller 125. If the image forming apparatus 100 is not to be shifted to the powered-off state ("NO" in step S106), the CPU 101 returns to the processing of step S100 and repeats the processing of steps S100 to S105. On the other hand, if the image forming apparatus 100 is to be shifted to the powered-off state ("YES" in step S106), the CPU 101 moves to the processing of step S107.

In steps S107 to S109, when the image forming apparatus 100 is to be shifted from the powered-on state to the powered-off state, the CPU 101 sets the registered NFC transmission data in the NFC controller 107 as data that is to be transmitted to an external apparatus via the NFC communication 700. In step S107, the CPU 101 reads out the setting data selected by the user in step S104 (i.e., the data registered as the NFC transmission data) from among the setting data stored in the RAM 102 or the HDD 104.

Furthermore, in step S108, the CPU 101 transmits the read-out setting data and a setting data hold command to the NFC controller 107 via the system bus 114, thereby causing the setting data to be stored in the flash ROM 127. According to this, the CPU 101 sets the read-out setting data in the NFC controller 107 as data that is to be transmitted to an external apparatus via the NFC communication 700. The NFC controller 107 stores the received setting data in the flash ROM 127 in accordance with the setting data hold command received from the CPU 101.

Here, when the image forming apparatus 100 is operating and when it is standing by (powered-on state), the NFC controller 107 uses the reader/writer mode and the card emulation mode at different times according to a command from the CPU 101. Accordingly, the image forming apparatus 100 enters a state in which it is possible to execute the NFC communication 700 with an external apparatus such as the mobile terminal 300 having an NFC reader/writer in the powered-on state. On the other hand, when the image forming apparatus 100 shifts from the powered-on state to the powered-off state, the CPU 101 sets the NFC controller 107 to the card emulation mode.

Specifically, in step S109, the CPU 101 transmits an operation mode change command for causing operation in the card emulation mode to the NFC controller 107 via the system bus 114. The NFC controller 107 sets the operation mode to the card emulation mode in accordance with the operation mode change command received from the CPU 101. Subsequently, in step S110, the CPU 101 transmits a command for switching the power supply unit 126 to the off state to the power supply controller 125. The power supply controller 125 controls the power supply unit 126 in accordance with the command from the CPU 101 and executes power-off processing by which the power supply unit 126 of the image forming apparatus 100 is switched to the off state.

While the image forming apparatus 100 is in the powered-off state, the NFC controller 107 operates by receiving a supply of power from an external apparatus (external reader/writer) via the NFC communication 700. For this reason, among the data held by the image forming apparatus 100, the data registered as NFC transmission data in step S104 needs to be data that is within the transmission capacity of the NFC controller 107 in the case of using power supplied via the NFC communication 700.

Also, while the image forming apparatus 100 is in the powered-off state, the flash ROM 127 may operate using the power supplied to the NFC controller 107 via the NFC communication 700. In this case, among the data held by the image forming apparatus 100, the data registered as NFC transmission data in step S104 needs to be data that is within the storage capacity of the flash ROM 127.

Note that in the present embodiment, the CPU 101 executes control of the devices according to commands, but, for example, this kind of control may be performed according to instructions given via a control signal line. Also, in the present embodiment, the processing of steps S106 to S110 is executed when the image forming apparatus 100 is to shift to the powered-off state. However, the processing of steps S106 to S110 may be executed when the image forming apparatus 100 is to shift to a power-saving state in which power is supplied to only some of the devices included in the image forming apparatus 100, excluding the NFC controller 107 for example. In other words, the present invention can be applied to processing in the case where the image forming apparatus 100 shifts to a state (second state) where at least the power consumption is at least lower than in the powered-on state.

<Example of Registration of Setting Data (Step S101, S102)>

Figure 5A:
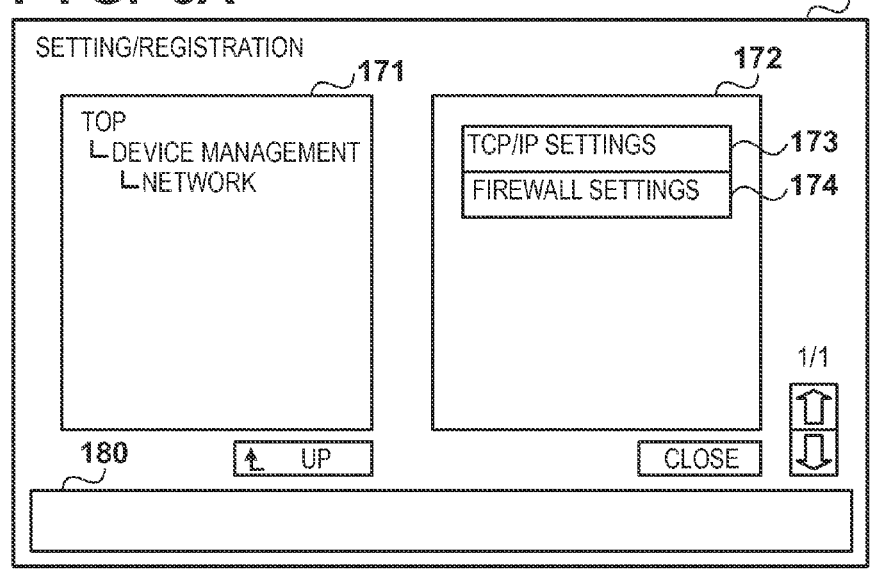
FIGS. 5A, 5B, and 5C are diagrams showing examples of configurations of UI screens for registering and changing setting data in the image forming apparatus 100 according to the first embodiment.
Figure 5B:
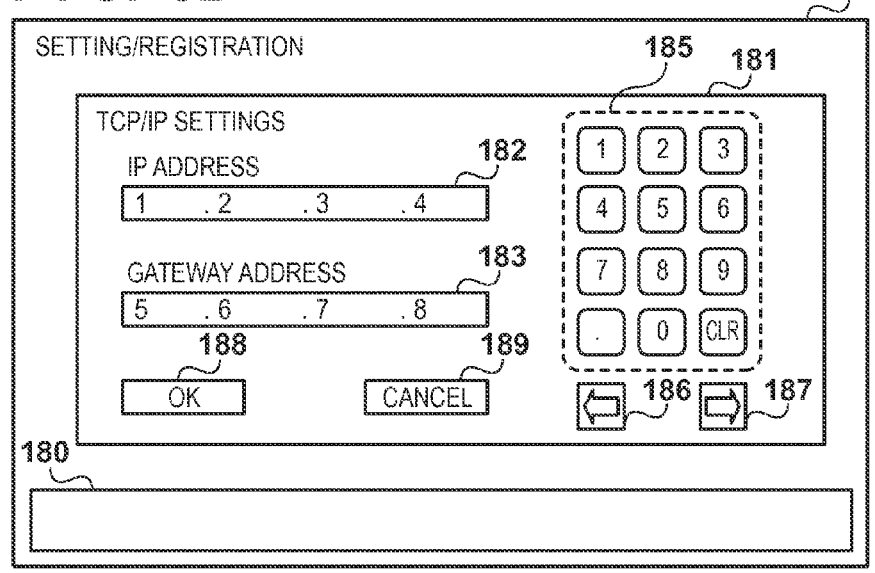
Figure 5C:
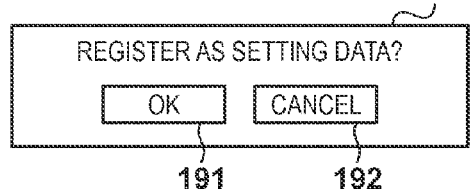

FIGS. 5A to 5C are diagrams showing examples of configurations of user interface (UI) screens for registering and changing setting data in the image forming apparatus 100 according to the present embodiment, and in steps S101 and S102, the UI screens are displayed on the operation unit 120 (the display unit thereof) by the CPU 101.

FIG. 5A shows a setting/registration UI screen for performing setting and registration in the image forming apparatus 100. The UI screen shown in FIG. 5A includes a hierarchy window 171 showing the currently-selected menu level, a menu display screen 172, and a message display box 180. In the menu display screen 172, a "TCP/IP setting" button 173 is used to perform TCP/IP setting, and a "firewall setting" button 174 is used to perform firewall setting. The message display box 180 displays messages such as simple descriptions of menu items selected by the user in the displayed UI screen.

FIG. 5B shows an example in which a TCP/IP setting window 181 is displayed on the operation unit 120 due to the user having pressed the "TCP/IP setting" button 173 in the UI screen shown in FIG. 5A. An IP address stored in the RAM 102 or the HDD 104 is displayed in an IP address display box 182 in the TCP/IP setting window 181. A gateway address stored in the RAM 102 or the HDD 104 is displayed in a gateway address display box 183. A numeric keypad 185 is used for changing setting information (setting data) held in the RAM 102 or the HDD 104 in the image forming apparatus 100, such as the IP address and the gateway address displayed in the display boxes 182 and 183. An OK button 188 is used for giving an instruction to register the setting information displayed in the TCP/IP setting window 181 in the image forming apparatus 100 (step S102). A cancel button 189 is used for returning the display screen to the UI screen shown in FIG. 5A without registering the setting information displayed in the TCP/IP setting window 181 in the image forming apparatus 100.

FIG. 5C shows an example in which a confirmation window 190 is displayed on the operation unit 120 due to the user having pressed the OK button 188 in the UI screen shown in FIG. 5B. In the confirmation window 190, the user can give a registration instruction for ultimately registering the input IP address information as setting data by pressing an OK button 191 (step S101). Also, the user can give an instruction for ending registration processing without registering the input IP address information as the setting data by pressing a cancel button 192.

<Example of Selection of Setting Data (Step S104)>

FIG. 6 is a diagram showing an example of the structure of data including setting data and selection flags indicating the selection status of the setting data, which are managed in the image forming apparatus 100 according to the present embodiment. As shown in FIG. 6, the setting data 160 is managed in the image forming apparatus 100 in a state in which it is stored in the RAM 102 or the HDD 104 with the selection flags 161 attached thereto.

For example, the image forming apparatus 100 manages the setting data 160 as data with a fixed capacity of 1024 bytes and attaches a selection flag 161 with a fixed size of 1 byte to the setting data. FIG. 6 shows that setting data A to G has been registered in the image forming apparatus 100, only the selection flag for the setting data B has been set to "1", and the selection flags for the other pieces of setting data are set to "0". When the selection flag 161 is "1", it indicates that the corresponding piece of setting data has been selected (registered) as NFC transmission data, and when it is "0", it indicates that the corresponding piece of setting data has not been selected (registered) as NFC transmission data. In the present embodiment, one of the pieces of setting data registered in the image forming apparatus 100 can be selected as NFC transmission data.

The selection flag is attached to the setting data when the setting data is registered in the image forming apparatus 100 (step S102). Also, when the selection of a piece of setting data is instructed ("YES" in step S103), "1" is set in the selection flag corresponding to the selected setting data and "0" is set in the selection flags corresponding to the other pieces of setting data (step S104). The setting data whose selection flag has been set to "1" enters a state of being registered as NFC transmission data.

The amount of setting data that can be registered as NFC transmission data may be a variable amount rather than a fixed amount as described above. Note that as described above, the amount of data that can be registered as NFC transmission data needs to be within the storage capacity of the flash ROM 127. As described above, while in the powered-on state (first state), the image forming apparatus 100 according to the present embodiment registers a piece of data held by the image forming apparatus 100 as NFC transmission data in the powered-off state (second state). Furthermore, when shifting from the powered-on state to the powered-off state, the image forming apparatus 100 sets the registered NFC transmission data in the NFC controller 107 as data that is to be transmitted to an external apparatus such as the mobile terminal 300 via NFC communication. The amount of NFC transmission data that can be registered is, for example, within the transmission capacity of the NFC controller 107 in the case of using the power supplied from an external apparatus via NFC communication in the powered-off state. According to the present embodiment, it is possible to register NFC transmission data in advance with consideration given to properties of the NFC controller 107 in the powered-off state. Accordingly, NFC transmission data for the case where the image forming apparatus 100 operates in the powered-off state can be selected more appropriately.

Second Embodiment

The first embodiment described a case in which the present invention has been applied to the image forming apparatus 100 as an example of a communication apparatus of the present invention. The second embodiment will describe a case in which the present invention has been applied to the mobile terminal 300 as an example of a communication apparatus of the present invention. For this reason, in the present embodiment, the mobile terminal 300 is an example of a communication apparatus capable of communicating with an external apparatus via short-range wireless communication, and the image forming apparatus 100 is an example of an external apparatus. Note that in order to simplify the description, the description will focus on portions that differ from the first embodiment.

<Configuration of Mobile Terminal>

FIG. 7 is a block diagram showing an example of the configuration of the mobile terminal 300 according to the present embodiment. The mobile terminal 300 includes a CPU 301, a RAM 302, a flash ROM 303, an operation unit 304, a camera 305, a wireless LAN I/F 306, an NFC controller 307, and a power supply monitoring unit 310, which are connected via a system bus 309. These devices can exchange data with each other via the system bus 309. Note that the functions of the NFC controller 307 of the mobile terminal 300 are the same as those of the NFC controller 107 of the image forming apparatus 100.

The CPU 301 performs overall control of the mobile terminal 300. The RAM 302 is a volatile memory that is used as a working memory for temporarily storing data that is to be used by the CPU 301 for arithmetic operations. The flash ROM 303 is a re-writeable non-volatile memory that stores programs and various kinds of data used by the CPU 301. The operation unit 304 includes a liquid crystal display (LCD) and a touch panel and functions as an input I/F for receiving input of information to the mobile terminal 300 according to an operation performed by a user of the mobile terminal 300, and as an output I/F for outputting information to the user.

The camera 305 captures still images or moving images. The wireless LAN I/F 306 is an I/F for exchanging data with an external apparatus such as the image forming apparatus 100 via wireless LAN communication 800. The NFC controller 307 performs control for performing the NFC communication 700 via the antenna 308 similarly to the NFC controller 107 of the image forming apparatus 100. The antenna 308 is an antenna for performing the NFC communication 700 and transmits/receives radio waves for the NFC communication 700 to/from an external apparatus.

The flash ROM 312 is connected to the NFC controller 307 and is used for holding data that is to be handled by the NFC controller 307, similarly to the flash ROM 127. Data that is to be transmitted by the NFC controller 307 via the antenna 308 via the NFC communication 700 can be stored in the flash ROM 312. Note that the mobile terminal 300 according to the present embodiment uses the flash ROM 312 to hold data that is to be handled by the NFC controller 307, but the present invention is not limited to this. For example, it is possible to use another non-volatile memory or a combination of a battery and an SRAM.

The power supply unit 311 is the power supply of the mobile terminal 300 and it is realized with a rechargeable battery. The power supply monitoring unit 310 monitors the state of the power supply unit 311, generates data indicating the state of the power supply unit 311, and transmits this data to the CPU 301 in response to a request from the CPU 301.

Figure 8A:
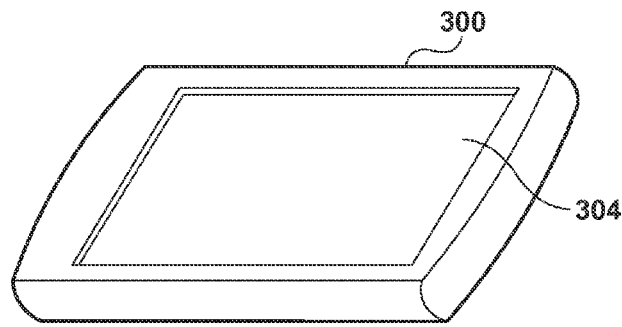
FIGS. 8A and 8B are diagrams showing the external appearance of the mobile terminal 300 according to the second embodiment.
Figure 8B:
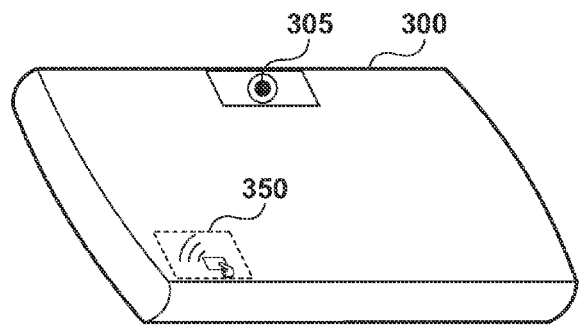

FIG. 8A and FIG. 8B are diagrams showing the external appearance of the mobile terminal 300 according to the present embodiment, FIG. 8A being a front view of the mobile terminal 300 and FIG. 8B being a rear view of the mobile terminal 300. As shown in FIG. 8A, the operation unit 304 is arranged on the front face of the mobile terminal 300. Also, as shown in FIG. 8B, the camera 305 and an NFC antenna mark 350 indicating the installation position of the antenna 308 are arranged on the back face of the mobile terminal 300. Note that the camera 305 and the NFC antenna mark 350 can be arranged at any location on the surface of the mobile terminal 300.

<Example of Registering NFC Transmission Data>

Figure 9:
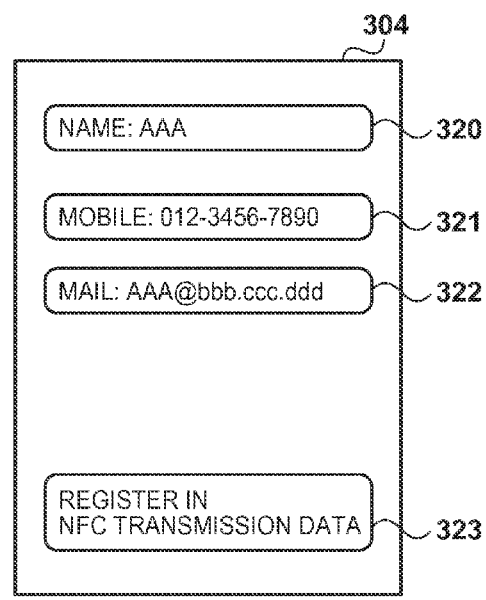
FIG. 9 is a diagram showing an example of the configuration of the UI screen for registering NFC transmission data in the mobile terminal 300 according to the second embodiment.

FIG. 9 is a diagram showing an example of the configuration of a UI screen for registering NFC transmission data in the mobile terminal 300 according to the present embodiment. The UI screen shown in FIG. 9 indicates an example of a registration screen for registering address information that is to be displayed on the operation unit 304 when the CPU 301 executes an address book program that runs on the mobile terminal 300.

Name, mobile phone number, and e-mail address input boxes 320 to 322 for the user who is the target of address information registration are displayed as objects on the registration screen shown in FIG. 9. Furthermore, a registration button 323 for registering the information input in the registration screen as NFC transmission data that is to be transmitted via the NFC communication 700 is displayed as an object. The coordinates pressed (touched) by the user via the operation unit 304 are received from the operation unit 304, and thereby the CPU 301 can detect whether or not any of the objects on the registration screen have been operated. Upon detecting that the registration button 323 has been touched, the CPU 101 records (registers) data including the information input to the input boxes 320 to 322 as NFC transmission data.

<Processing for Registering NFC Transmission Data>

Figure 10:
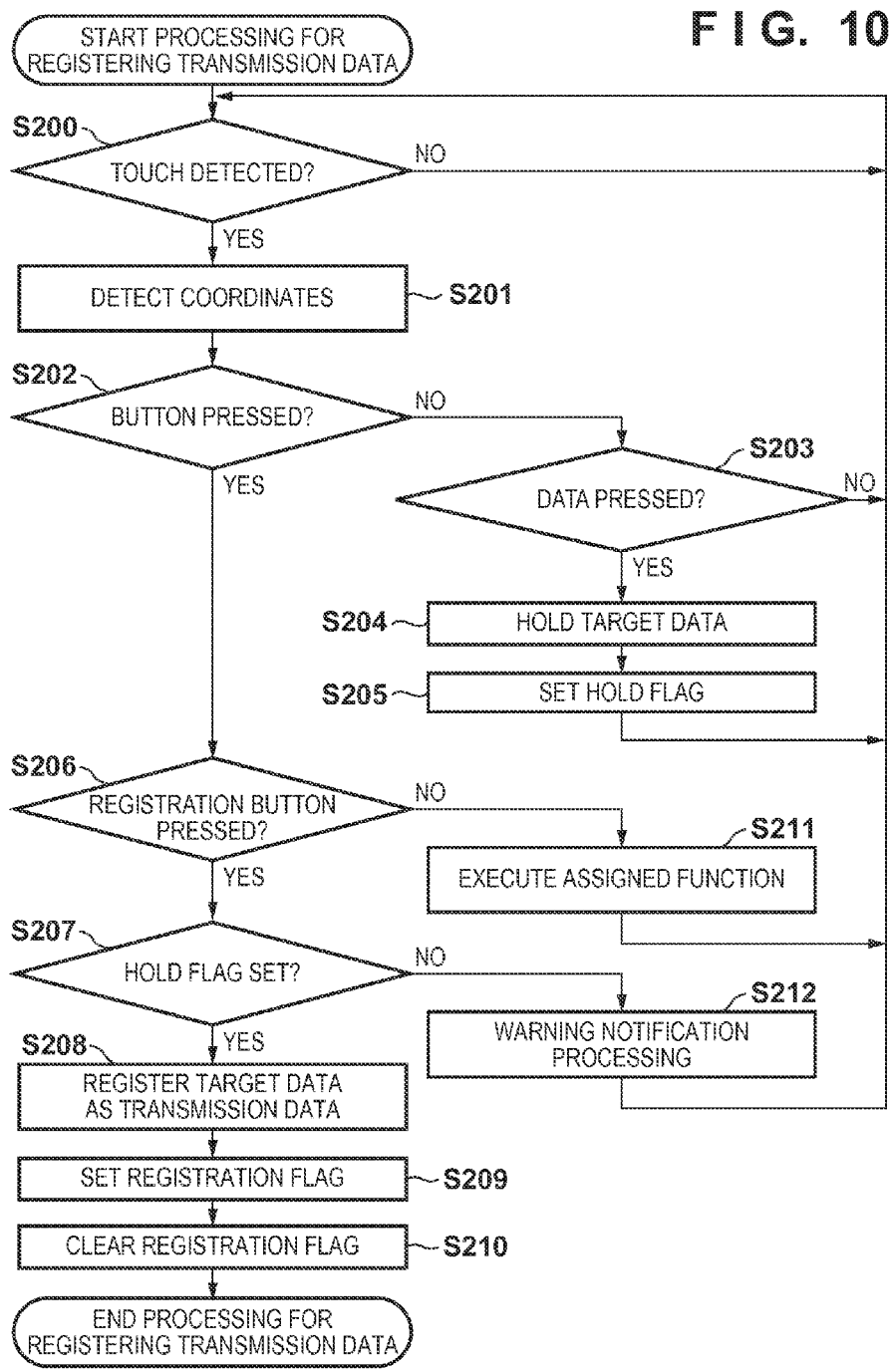
FIG. 10 is a flowchart showing a procedure of processing for registering NFC transmission data in the mobile terminal 300 according to the second embodiment.

FIG. 10 is a flowchart showing a procedure of processing for registering NFC transmission data in the mobile terminal 300 according to the present embodiment. Note that the processing shown in FIG. 10 is realized in the mobile terminal 300 by the CPU 301 reading out a program in the flash ROM 303 to the RAM 302 and executing it in the powered-on state in which the power supply unit 311 has been started.

In step S200, the mobile terminal 300 receives an operation (touch) from the user via the operation unit 304 (the touch panel thereof) in the powered-on state in which the power supply unit 311 has been started. Upon detecting that the user has touched the operation unit 304 ("YES" in step S200), in step S201, the CPU 301 detects the coordinates that were touched on the operation unit 304 based on coordinate data transmitted from the operation unit 304 via the system bus 309.

Next, in step S202, the CPU 301 determines whether or not any of the objects displayed on the operation unit 304 have been touched by the user based on the detected coordinates.

If the touched object is not a button ("NO" in step S202), and the object is not data ("NO" in step S203), the CPU 301 returns to the processing of step S200 and once again enters the standby state.

If the touched object is not a button ("NO" in step S202), and the object is data ("YES" in step S203), in step S204, the CPU 301 temporarily holds the data held by the object (target data) in the RAM 302. Furthermore, in step S205, the CPU 301 sets a hold flag indicating that the data is held and returns to the processing of step S200.

If the touched object is a button ("YES" in step S202) and is not the registration button ("NO" in step S206), in step S211, the CPU 301 executes the function assigned to the pressed button and returns to the processing of step S200.

If the touched object is a button ("YES" in step S202) and is the registration button ("YES" in step S206), the CPU 301 moves to the processing of step S207.

In step S207, the CPU 301 determines whether or not the hold flag has been set, and if the hold flag has not been set ("NO" in step S207), the CPU 301 displays a warning message on the operation unit 304 in step S212 and returns to the processing of step S200. On the other hand, if the hold flag has been set ("YES" in step S207), in step S208, the CPU 301 registers the target data that is temporarily being held in the RAM 302 as data that is to be transmitted via the NFC communication 700. Note that the registered data is stored in the RAM 302 or the flash ROM 303. Furthermore, in step S209, the CPU 301 sets a registration flag indicating that the data has been registered as the NFC transmission data, and in step S210, the CPU 301 clears the hold flag and ends the processing.

<Processing for Setting NFC Transmission Data>

Figure 11:
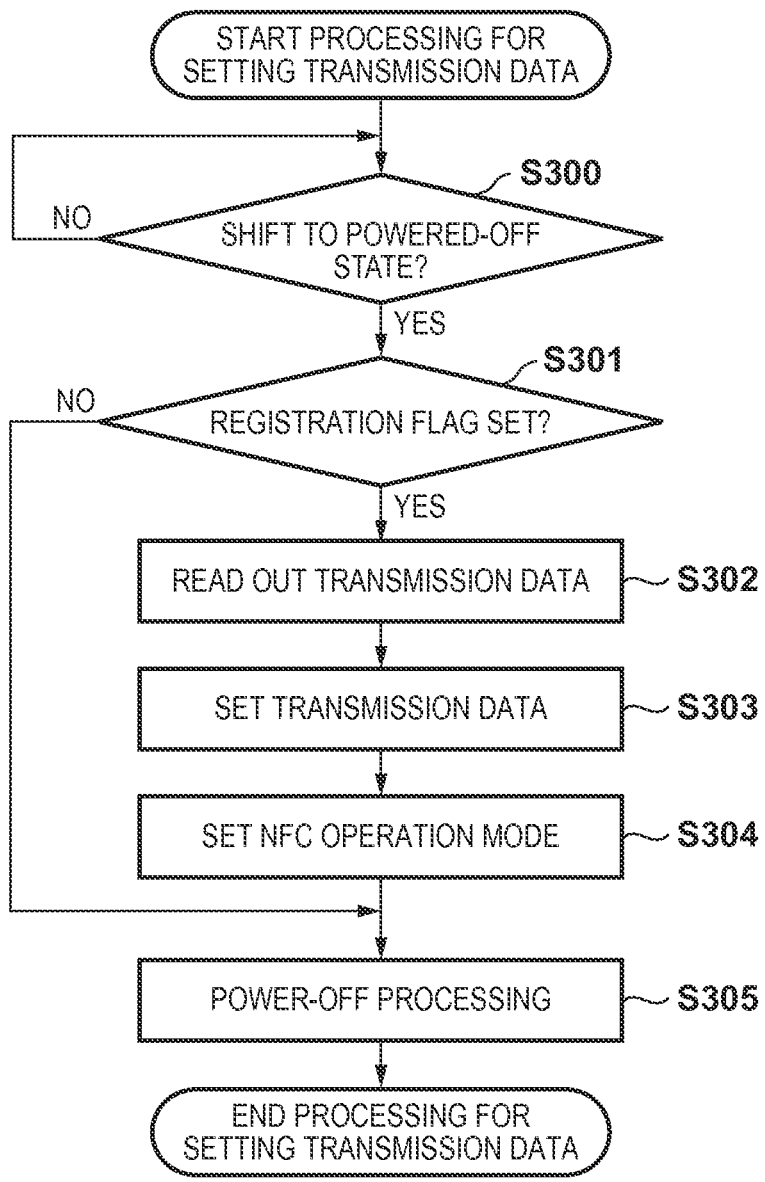
FIG. 11 is a flowchart showing a procedure of processing for setting NFC transmission data in the mobile terminal 300 according to the second embodiment.

FIG. 11 is a flowchart showing a procedure of processing for setting NFC transmission data in the mobile terminal 300 according to the present embodiment. Note that the processing shown in FIG. 11 is realized in the mobile terminal 300 by the CPU 301 reading out a program in the flash ROM 303 to the RAM 302 and executing it in the powered-on state in which the power supply unit 311 has been started.

In the present embodiment, data obtained by converting the amount of power remaining (remaining amount) in the power supply unit 311 to a numerical value is periodically received by the CPU 301 from the power supply monitoring unit 310. In step S300, the remaining amount of the power supply unit 311 and a predetermined default value that is set in advance in the program are compared, and thereby it is determined whether or not the mobile terminal 300 is to be shifted from the powered-on state (first state) to the powered-off state (second state). In step S300, if the remaining amount of the power supply unit 311 is at or above the default value, the CPU 301 determines that the mobile terminal 300 is not to be shifted to the powered-off state ("NO" in step S300), and the determination processing in step S300 is repeated. On the other hand, if the remaining amount of the power supply unit 311 is less than the default value, the CPU 301 determines that the mobile terminal 300 is to be shifted to the powered-off state ("YES" in step S300) and moves to the processing of step S301.

In step S301, the CPU 301 determines whether or not the registration flag, which indicates that data that is to be transmitted via the NFC communication 700 (NFC transmission data) has been registered, has already been set. If the registration flag has not been set ("NO" in step S301), the CPU 301 moves to the processing of step S305 and executes power-off processing for switching the power supply unit 311 of the mobile terminal 300 to the off state. On the other hand, if the registration flag has been set ("YES" in step S301), the CPU 301 moves to the processing of step S302.

In step S302, the CPU 301 reads out the data registered as NFC transmission data from the RAM 302 or the flash ROM 303. Furthermore, in step S303, the CPU 301 transmits the read-out registration data and a registration data hold command to the NFC controller 307 via the system bus 309, and thereby the registration data is stored in the flash ROM 312. According to this, the CPU 301 sets the read-out registration data in the NFC controller 307 as data that is to be transmitted to an external apparatus via the NFC communication 700. The NFC controller 307 stores the received registration data in the flash ROM 312 in accordance with the registration data hold command that was received from the CPU 301.

Subsequently, in step S304, the CPU 301 transmits the operation mode change command for causing the mobile terminal 300 to operate in the card emulation mode to the NFC controller 307 via the system bus 309. The NFC controller 307 sets the operation mode to the card emulation mode in accordance with the operation mode change command received from the CPU 301. Subsequently, in step S305, the CPU 101 executes power-off processing for switching the power supply unit 311 of the mobile terminal 300 to the off state.

As described above, according to the present embodiment, it is possible to provide a mechanism by which the technique applied to the image forming apparatus 100 in the first embodiment is applied to the mobile terminal 300 as well.

Note that in the present embodiment, the processing of steps S300 to S305 is executed when the mobile terminal 300 is to shift to the powered-off state. However, the processing of steps S300 to S305 may be executed when the mobile terminal 300 is to shift to the power-saving state, similarly to the case of the first embodiment. In other words, the present invention can be applied to processing in the case where the mobile terminal 300 shifts to a state (second state) where at least the power consumption is at least lower than in the powered-on state.

Third Embodiment

A modification of the first embodiment will be described in the third embodiment. Specifically, an example will be described in which information regarding an error that has occurred (error information) in the image forming apparatus 100 is registered as NFC transmission data. Note that in order to simplify the description, the description will focus on portions that are different from the first embodiment.

<Processing for Registering Error Information>

Figure 12:
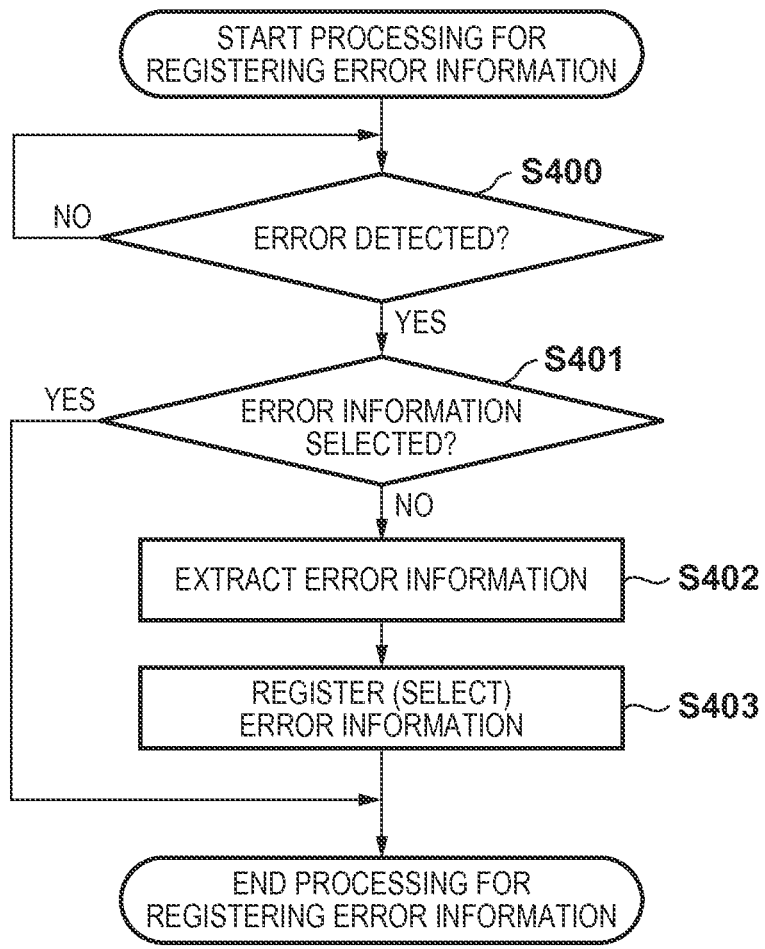
FIG. 12 is a flowchart showing a procedure of processing for registering error information as NFC transmission data in the image forming apparatus 100 according to a third embodiment.

FIG. 12 is a flowchart showing a procedure of processing for registering error information as NFC transmission data in the image forming apparatus 100 according to the present embodiment. Note that the processing shown in FIG. 12 is realized in the image forming apparatus 100 by the CPU 101 reading out a program stored in the ROM 103 to the RAM 102 and executing it in the powered-on state in which the power supply unit 126 is operating. Note that in the present embodiment, the data corresponding to the error information is managed in the image forming apparatus 100 as one of the pieces of setting data shown in FIG. 6 in a state where the selection flag is attached.

In step S400, while the image forming apparatus 100 is in the powered-on state, the CPU 101 determines whether or not an error that has occurred in a device has been detected based on information received from the devices via the system bus 114 and the image bus 115. If an error has not been detected ("NO" in step S400), the CPU 101 repeats the determination processing of step S400, whereas if an error is detected ("YES" in step S400), the procedure moves to the processing of step S401.

In step S401, the CPU 101 checks the value of the selection flag corresponding to error information that is being held in the RAM 102 or the HDD 104, and determines whether or not error information has already been registered as NFC transmission data. If the selection flag corresponding to error information is "1", the CPU 101 determines that error information has been selected ("YES" in step S401) and ends the processing without selecting the error information regarding the detected error as NFC transmission data.

On the other hand, if the value of the selection flag corresponding to error information is "0", the CPU 101 determines that error information has not been selected as NFC transmission data ("NO" in step S401) and moves to the processing of step S402. In step S402, the CPU 101 extracts the error information from the data received from the device in which the error occurred. Furthermore, in step S403, the CPU 101 registers (selects) the extracted error information as NFC transmission data. In other words, the CPU 101 sets the selection flag attached to the setting data corresponding to error information (FIG. 6) to "1".

Note that the present embodiment has described a case in which only the error information regarding the error that was detected first is registered as NFC transmission data after the image forming apparatus 100 is started up. However, if multiple errors occur, information obtained by compiling the information regarding the multiple errors may be registered as the NFC transmission data, or information regarding the error that occurred last may be registered as NFC transmission data.

<Processing for Setting NFC Transmission Data>

Figure 13:
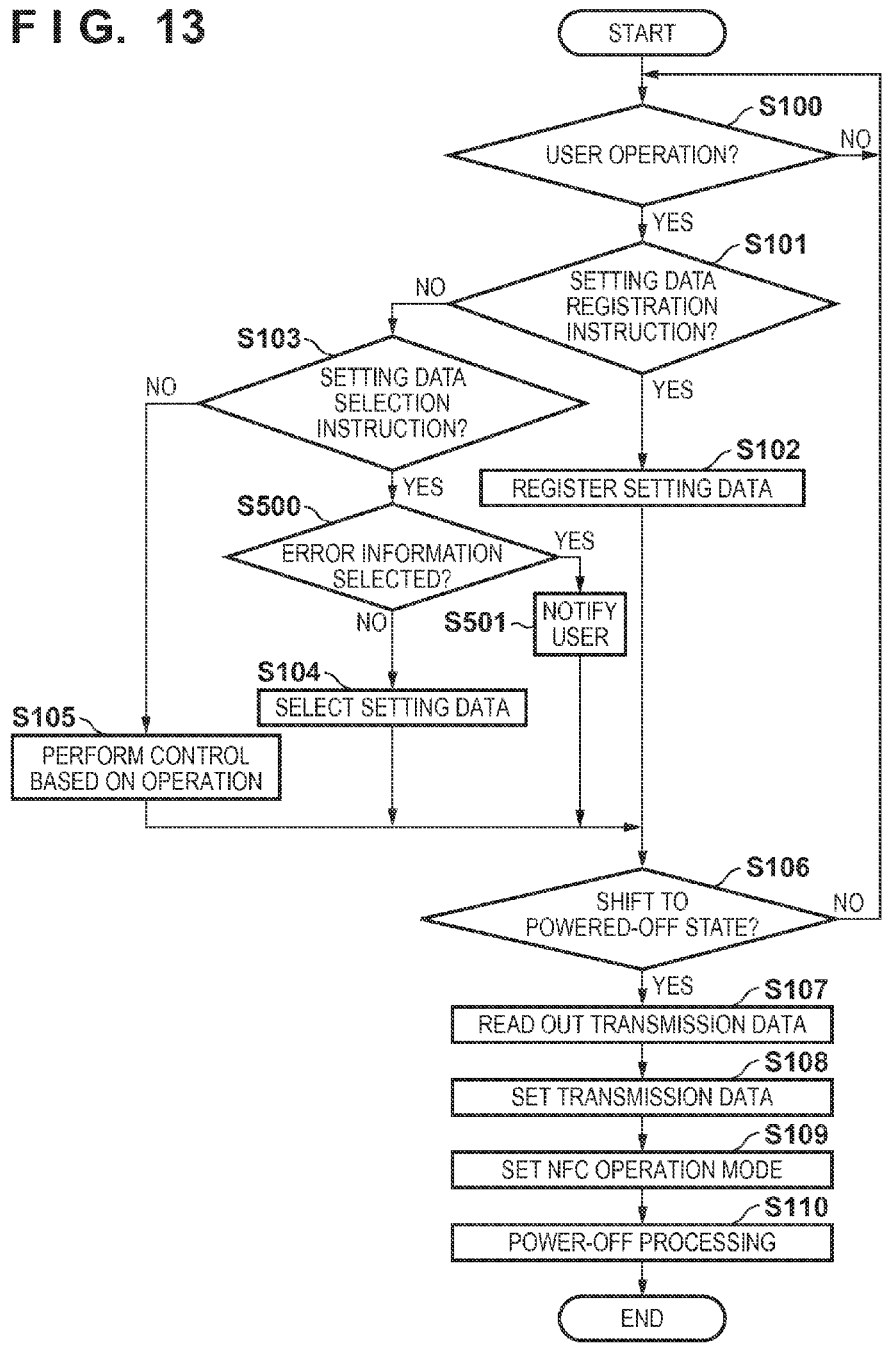
FIG. 13 is a flowchart showing a procedure of processing for setting NFC transmission data in the image forming apparatus 100 according to the third embodiment.

FIG. 13 is a flowchart showing a procedure of processing for setting NFC transmission data in the image forming apparatus 100 according to the present embodiment. Note that the processing shown in FIG. 13 is realized in the image forming apparatus 100 by the CPU 101 reading out a program stored in the ROM 103 to the RAM 102 and executing it in the powered-on state in which the power supply unit 126 is operating. Note that steps for executing processing that is similar to that of the first embodiment (FIG. 4) are denoted by the same reference numerals and the descriptions thereof will not be repeated.

In the present embodiment, the CPU 101 determines in step S103 whether or not an instruction to select setting data has been given through a user operation, and if the result of the determination is that the instruction to select setting data has been given ("YES" in step S103), the procedure moves to the processing of step S500. In step S500, the CPU 301 checks the selection flag (FIG. 6) attached to the setting data corresponding to error information, thereby determining whether or not error information has been registered (selected) as NFC transmission data. If error information has not been selected as NFC transmission data ("NO" in step S500), the CPU 101 moves to the processing of step S104 and receives input of the setting data selection information from the user via the operation unit 120, similarly to the case of the first embodiment. Upon receiving the input selection information from the operation unit I/F 105 via the system bus 114, the CPU 101 selects the setting data based on the received selection information in step S104. Subsequently, the procedure moves to the processing of step S106.

On the other hand, if error information has been selected as NFC transmission data ("YES" in step S500), the CPU 101 moves to the processing of step S501. In step S501, the CPU 301 displays information to the user indicating that error information has already been registered as setting data on the operation unit 120, thereby notifying the user of that information. Subsequently, the procedure moves to the processing of step S106.

<Example of Registration and Selection of Setting Data>

Figure 14A:
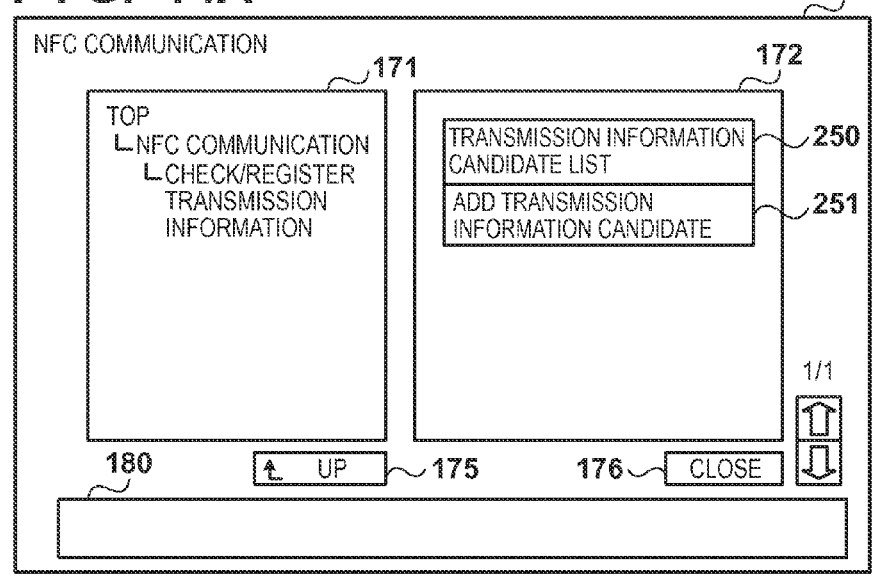
FIGS. 14A and 14B are diagrams showing examples of configurations of UI screens for changing and deleting NFC transmission data in the image forming apparatus 100 according to the third embodiment.
Figure 14B:
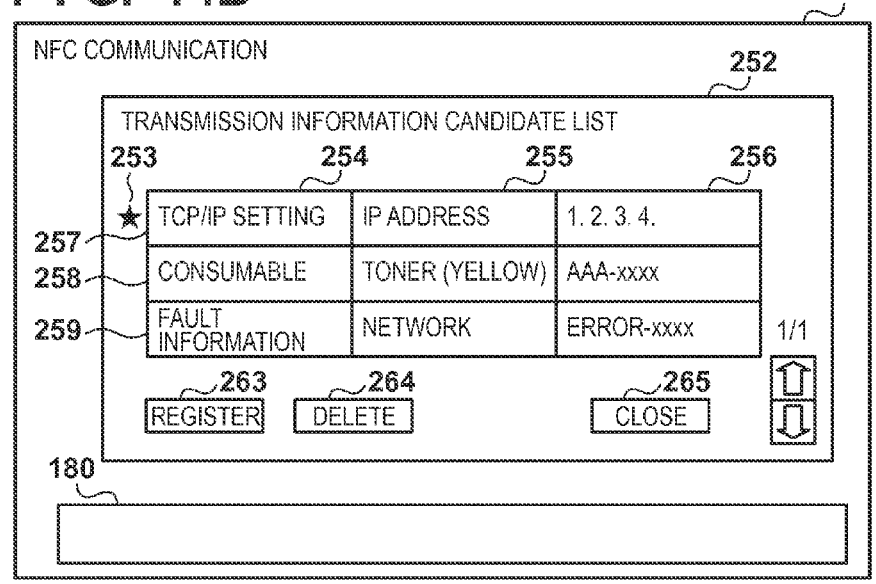

FIG. 14A and FIG. 14B are diagrams showing examples of configurations of UI screens for changing and deleting NFC transmission data according to the present embodiment, and are displayed by the CPU 101 on the operation unit 120 (the display unit thereof) in steps S101 to S104, and steps S500 and S501.

FIG. 14A shows a UI screen for changing and deleting NFC transmission data in the image forming apparatus 100. The UI screen shown in FIG. 14A includes a hierarchy window 171 showing the currently-selected menu level, a menu display screen 172, and a message display box 180. In the menu display screen 172, a "transmission information candidate list" button 250 is used for displaying a list of information to be transmitted via the NFC communication 700, and an "add transmission information candidate" button 251 is used for adding information to be transmitted via the NFC communication 700. The message display box 180 displays messages such as simple descriptions of menu items selected by the user in the displayed UI screen.

FIG. 14B shows an example in which a transmission information candidate list window 252 has been displayed due to the user pressing the "transmission information candidate list" button 250 on the UI screen shown in FIG. 14A. In the window 252, transmission candidate information 257 to 259 indicates information that can be transmitted via the NFC communication 700. Also, an item 254 indicates an attribute of the transmission candidate information, an item 255 indicates an individual attribute of the transmission candidate information, and an item 256 indicates the content of the transmission candidate information. Also, a star mark 253 indicates that the transmission candidate information 257 to which it is attached has been selected as NFC transmission data that is to be transmitted via the NFC communication 700.

The user selects any of the pieces of transmission candidate information 257 to 259 in the window 252. Furthermore, by pressing a "register transmission information" button 263, it is possible to give an instruction to register the selected transmission candidate information as information that is to actually be transmitted via the NFC communication 700. Accordingly, the star mark 253 is displayed next to the selected transmission candidate information. Also, by pressing a "delete transmission information" button 264 when any of the transmission candidate information has been selected, the user can give an instruction to delete the selected transmission candidate information. A "close" button 265 is used for closing the display of the window 252 and returning the display screen to the UI screen shown in FIG. 14A.

As described above, in the present embodiment, in response to an error occurring in the image forming apparatus 100, information regarding the error is registered as NFC transmission data. According to this, it is possible to provide error information to an external apparatus such as the mobile terminal 300 even if the image forming apparatus 100 has shifted to the powered-off state after an error has occurred.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-106593, filed May 20, 2013, which is hereby incorporated by reference herein in its entirety.

What is claimed is:

1. A communication apparatus comprising:
a short-range wireless communication unit configured to perform short-range wireless communication, wherein the short-range wireless communication unit has a plurality of operation modes, one of which is a card emulation mode for allowing an external apparatus to read information held by the short-range wireless communication unit;
a selecting unit configured to select, in accordance with a user's instruction, a piece of data that is to be held by the short-range wireless communication unit from among a plurality of pieces of candidate data;
a detecting unit configured to detect that the communication apparatus shifts to a powered-off state; and
a controlling unit configured to, when the detection unit detects that the communication apparatus shifts to the powered-off state, cause the short-range wireless communication unit to hold the piece of data selected by the selecting unit and set the card emulation mode as an operation mode of the short-range wireless communication unit;
wherein in a case where an error has occurred in the communication apparatus, the controlling unit causes the short-range wireless communication unit to hold error information about the error instead of the piece of data selected by the selecting unit.

2. The communication apparatus according to claim 1, further comprising:
a displaying unit configured to display a selection screen for a user to select a piece of data that is to be held by the short-range wireless communication unit from among the plurality of pieces of candidate data,
wherein the selecting unit selects the piece of data that is to be held by the short-range wireless communication unit in accordance with the user's instruction input via the selection screen.

3. The communication apparatus according to claim 1, wherein the plurality of pieces of candidate data include an address of the communication apparatus.

4. The communication apparatus according to claim 1, wherein the short-range wireless communication is near field communication.

5. The communication apparatus according to claim 1, wherein the communication apparatus is a printing apparatus that can execute printing.

6. The communication apparatus according to claim 1, wherein the communication apparatus is a mobile terminal.

7. A communication apparatus comprising:
a short-range wireless communication unit configured to perform short-range wireless communication, wherein the short-range wireless communication unit has a plurality of operation modes, one of which is a card emulation mode for allowing an external apparatus to read information held by the short-range wireless communication unit;
a selecting unit configured to select, in accordance with a user's instruction, a piece of data that is to be held by the short-range wireless communication unit from among a plurality of pieces of candidate data;
a detecting unit configured to detect that the communication apparatus shifts to a power-saving state; and
a controlling unit configured to, when the detection unit detects that the communication apparatus shifts to the power-saving state, cause the short-range wireless communication unit to hold the piece of data selected by the selecting unit and set the card emulation mode as an operation mode of the short-range wireless communication unit;
wherein in a case where an error has occurred in the communication apparatus, the controlling unit causes the short-range wireless communication unit to hold error information about the error instead of the piece of data selected by the selecting unit.

8. The communication apparatus according to claim 7, further comprising:
a displaying unit configured to display a selection screen for a user to select a piece of data that is to be held by the short-range wireless communication unit from among the plurality of pieces of candidate data,
wherein the selecting unit selects the piece of data that is to be held by the short-range wireless communication unit in accordance with the user's instruction input via the selection screen.

9. The communication apparatus according to claim 7, wherein the plurality of pieces of candidate data include an address of the communication apparatus.

10. The communication apparatus according to claim 7, wherein the short-range wireless communication is near field communication.

11. The communication apparatus according to claim 7, wherein the communication apparatus is a printing apparatus that can execute printing.

12. The communication apparatus according to claim 7, wherein the communication apparatus is a mobile terminal.

13. A method for controlling a communication apparatus comprising a short-range wireless communication unit configured to perform short-range wireless communication, the short-range wireless communication unit having a plurality of operation modes, one of which is a card emulation mode for allowing an external apparatus to read information held by the short-range wireless communication unit, the method comprising:

selecting, in accordance with a user's instruction, a piece of data that is to be held by the short-range wireless communication unit from among a plurality of pieces of candidate data;

detecting that the communication apparatus shifts to a powered-off state; and when it is detected that the communication apparatus shifts to the powered-off state, causing the short-range wireless communication unit to hold the piece of data selected in the selecting, and setting the card emulation mode as an operation mode of the short-range wireless communication unit;

wherein in a case where an error has occurred in the communication apparatus, the controlling unit causes the short-range wireless communication unit to hold error information about the error instead of the piece of data selected by the selecting unit.

14. A non-transitory computer-readable storage medium storing a computer program for causing a computer to execute a method for controlling a communication apparatus comprising a short-range wireless communication unit configured to perform short-range wireless communication, the short-range wireless communication unit having a plurality of operation modes, one of which is a card emulation mode for allowing an external apparatus to read information held by the short-range wireless communication unit, the method comprising:

selecting, in accordance with a user's instruction, a piece of data that is to be held by the short-range wireless communication unit from among a plurality of pieces of candidate data;

detecting that the communication apparatus shifts to a powered-off state; and when it is detected that the communication apparatus shifts to the powered-off state, causing the short-range wireless communication unit to hold the piece of data selected in the selecting, and setting the card emulation mode as an operation mode of the short-range wireless communication unit;

wherein in a case where an error has occurred in the communication apparatus, the controlling unit causes the short-range wireless communication unit to hold error information about the error instead of the piece of data selected by the selecting unit.

15. A method for controlling a communication apparatus comprising a short-range wireless communication unit configured to perform short-range wireless communication, the short-range wireless communication unit having a plurality of operation modes, one of which is a card emulation mode for allowing an external apparatus to read information held by the short-range wireless communication unit, the method comprising:

selecting, in accordance with a user's instruction, a piece of data that is to be held by the short-range wireless communication unit from among a plurality of pieces of candidate data;

detecting that the communication apparatus shifts to a power-saving state; and when it is detected that the communication apparatus shifts to the power-saving state, causing the short-range wireless communication unit to hold the piece of data selected in the selecting, and setting the card emulation mode as an operation mode of the short-range wireless communication unit;

wherein in a case where an error has occurred in the communication apparatus, the controlling unit causes the short-range wireless communication unit to hold error information about the error instead of the piece of data selected by the selecting unit.

16. A non-transitory computer-readable storage medium storing a computer program for causing a computer to execute a method for controlling a communication apparatus comprising a short-range wireless communication unit configured to perform short-range wireless communication, the short-range wireless communication unit having a plurality of operation modes, one of which is a card emulation mode for allowing an external apparatus to read information held by the short-range wireless communication unit, the method comprising:

selecting, in accordance with a user's instruction, a piece of data that is to be held by the short-range wireless communication unit from among a plurality of pieces of candidate data;

detecting that the communication apparatus shifts to a power-saving state; and when it is detected that the communication apparatus shifts to the power-saving state, causing the short-range wireless communication unit to hold the piece of data selected in the selecting, and setting the card emulation mode as an operation mode of the short-range wireless communication unit;

wherein in a case where an error has occurred in the communication apparatus, the controlling unit causes the short-range wireless communication unit to hold error information about the error instead of the piece of data selected by the selecting unit.

* * * * *